United States Patent
Kim et al.

(10) Patent No.: US 10,984,281 B2
(45) Date of Patent: Apr. 20, 2021

(54) SYSTEM AND METHOD FOR CORRECTING COLOR OF DIGITAL IMAGE BASED ON THE HUMAN SCLERA AND PUPIL

(71) Applicants: ELC MANAGEMENT LLC, Melville, NY (US); KAIST UNIVERSITY, Daejeon (KR)

(72) Inventors: Songyup Kim, Jersey City, NJ (US); Hyeon-Jeong Suk, Daejeon (KR); Kyungah Choi, Daejeon (KR); Hayan Choi, Daejeon (KR)

(73) Assignees: KAIST UNIVERSITY, Daejeon (KR); ELC MANAGEMENT LLC, Melville, NY (US)

( * ) Notice: Subject to any disclaimer, the term of this patent is extended or adjusted under 35 U.S.C. 154(b) by 0 days.

(21) Appl. No.: 16/346,821

(22) PCT Filed: Feb. 3, 2017

(86) PCT No.: PCT/US2017/016384
§ 371 (c)(1),
(2) Date: May 1, 2019

(87) PCT Pub. No.: WO2018/080575
PCT Pub. Date: May 3, 2018

(65) Prior Publication Data
US 2020/0065609 A1    Feb. 27, 2020

(30) Foreign Application Priority Data
Sep. 12, 2016  (KR) .................. 10-2016-0117234

(51) Int. Cl.
*H04N 7/18*       (2006.01)
*G06K 9/46*       (2006.01)
(Continued)

(52) U.S. Cl.
CPC ......... *G06K 9/4652* (2013.01); *G06K 9/0061* (2013.01); *G06K 9/00234* (2013.01);
(Continued)

(58) Field of Classification Search
CPC ............. G06K 9/4652; G06K 9/00234; G06K 9/0061; G06T 5/009; G06T 5/50; H04N 5/23219
(Continued)

(56) References Cited

U.S. PATENT DOCUMENTS

2012/0177266 A1    7/2012   Tsukizawa et al.
2014/0285768 A1*   9/2014   Barnard ................ G06T 7/0014
                                                          351/206

FOREIGN PATENT DOCUMENTS

JP    2008-160279    7/2001
JP    2013-207721    10/2013

OTHER PUBLICATIONS

Choi, et al.; The human sclera and pupil as the calibration targets; Society for Imaging Science and Technology; vol. 2017 No. 17: pp. 200-203, Jan. 2017.
(Continued)

*Primary Examiner* — Nguyen T Truong
(74) *Attorney, Agent, or Firm* — Idris N. McKelvey

(57) ABSTRACT

The color correction method in accordance with an embodiment of the present invention can comprise the steps of: acquiring an image from a captured image; detecting the face and eyes from the captured image; separating the sclera and pupil of the detected eye(s); correcting the image by comparing the areas of the sclera and pupil extracted by separating the sclera and pupil with the reference values stored in a database; and extracting the skin color of the face from the corrected image.

18 Claims, 6 Drawing Sheets

(51) Int. Cl.
G06K 9/00 (2006.01)
G06T 5/00 (2006.01)
G06T 5/50 (2006.01)
H04N 5/232 (2006.01)

(52) U.S. Cl.
CPC ........... *G06T 5/009* (2013.01); *G06T 5/50* (2013.01); *H04N 5/23219* (2013.01); *G06T 2207/10024* (2013.01); *G06T 2207/30201* (2013.01)

(58) Field of Classification Search
USPC .......................................................... 348/78
See application file for complete search history.

(56) References Cited

OTHER PUBLICATIONS

Do, et al.;Skin Color Detection through Estimation and Conversion of Illuminant Color using Sclera Region of Eye under Varying Illumination; Proceedings/ The 18th International Conference on Pattern Recognition; IEEE Computer Society; p. 4; Aug. 2006.
Harville, et al.; Consistent Image-Based Measurement and Classification of Skin Color, IEEE International Conference on Image Processing; United States; URL https:/ieeexplore.ieee.org/stamp/stamp.jsp?tp=&anumber=1530070 (a document showing conventional techniques): pp. 4; 2005.
Kobayashi, et al.; Development on Diagnosis System for Psychiatric Disorder by Analyzing Facial Images; Technical Report of the Proceeding of the Institute of Electronics, information and Communication Engineers; vol. 101; No. 333; Japan, Institute of Electronics, Information and Communication Engineers; pp. 31-38: 2001.
Otsu, Noboyukt: A Threshold Selection Method from Gray-Level Histograms, IEEE Transactions on Systems, Man, Cybernetics; pp. 62-66: 1979.
PCT International Search Report, International Application No. PCT/US2017/016384; Completion Date: Jul. 7, 2017; dated Jul. 17, 2017.
PCT Written Opinion of the International Searching Authority; International Application No. PCT/US2017/016384: Completion Date: Jul. 7, 2017; dated Jul. 17, 2017.
Rastislav Lukac; Color Image Processing: Methods and Applications: pp. 259-298; Jan. 2006.
Supplementary European Search Report EP Application No. 17864450. 6; Completion Date: Sep. 18, 2019; dated Sep. 26, 2019.
Wang, et al.: Measuring Human Skin Colour and Imaging Conference; University of Leeds; United States; http://eprints.whiterose. ac.uk91398/8/wang_xiao/wuerger_cheung_luo_CIC2015_Final. pdf (a document is showing conventional techniques): pp. 6; 2015.

* cited by examiner

SYSTEM AND METHOD FOR CORRECTING COLOR OF DIGITAL IMAGE BASED ON THE HUMAN SCLERA AND PUPIL

FIELD OF THE INVENTION

The present invention relates to an image processing technology and, more particularly, the present invention relates to a method and system for correcting skin color on the basis of the colors of the human sclera and pupil.

BACKGROUND

Recently, various techniques have been proposed in relation to makeup using devices; however, most of them do not take the facial skin color of the user and the lighting environment into consideration. The conventional arts disclose methods for measuring real skin color without the effect of illumination; however, they have such disadvantages as having to make use of the devices for measuring color information based on a spectrum not available to common users.

In addition, there has been proposed such techniques as to take pictures with a standard color table to conveniently measure the lighting environment; however, the technique requires preparation of a color table and using it in the course of taking pictures.

In addition, Do et al. (2012) proposed a method for correcting illumination using the sclera of the human eye; however, this method has difficulty extracting the correct skin color because the range of skin colors extracted is too wide, including shadow and highlights.

As such, the demand has emerged for a technology able to extract the correct facial skin color from images using the sclera and pupil of the human eye to improve user convenience and provide a basis for various makeup-related programs.

SUMMARY

The present invention can provide a method for correcting colors, wherein the method detects the face and eyes from an image for correcting color on the basis of the sclera and pupil of the eye. More particularly, the present invention can provide a method for correcting an image and extracting facial skin color from the corrected image by detecting the face and eyes from the image, extracting the sclera and pupil of the eye, and comparing the extracted area of the sclera and pupil to the reference values stored in a database.

The method for correcting color in accordance with an embodiment of the present invention can comprise the steps of: acquiring an image by taking a picture; detecting the face and the eyes from the acquired image; extracting the sclera and pupil of the detected eye(s); correcting the image by comparing the extracted sclera and pupil areas to the reference values stored in a database; and extracting the color of the facial skin from the corrected image.

The steps of extracting the sclera and the pupil of the detected eye(s) can comprise the steps of: dividing the sclera and pupil using the Otsu algorithm and eye-shape mask; extracting the area of the sclera having a brightness higher than a preset value by dividing the sclera on the basis of a critical lighting value; and extracting the area of the pupil having a brightness lower than a preset value by detecting the boundary between the pupil and sclera.

The step of correcting the image can comprise the step of: converting the colors of the image on the basis of the reference values to which the area of the sclera extracted from the sclera having a brightness higher than a preset value and the area of the pupil extracted from the pupil having a brightness lower than a preset value are compared.

The step of extracting facial skin color can comprise the step of: extracting a skin area with reference to the center of the face of the corrected image and comparing the extracted skin area to the measured values of stored skin color to detect the skin area of the face from the corrected image and to extract the skin color by filtering the skin area of the face on the basis of the measurement range of a L*a*b value.

The step of extracting the skin color of the face from the corrected image can comprise a step of displaying the skin area of the face extracted from the corrected image and the color of the facial skin extracted from the corrected image.

The color correction method can further comprise a step of storing reference values in a database for extracting the color of the facial skin according to the difference lighting environments, wherein the step of storing the reference values in the database for extracting the color of the facial skin according to the difference lighting environments can be a step of storing the image correction measurement values of the sclera and pupil for image correction and the skin color measurement value measured with the face.

The step of storing the reference values in the database for extracting the color of the facial skin according to the difference lighting environments can comprise a step of converting an image captured under a different lighting environment with reference to a standard color tone including the skin color.

The step of storing the reference values in the database for extracting the color of the facial skin according to the difference lighting environments can comprise a step of storing an average value of the measured values of the skin colors measured from at least one or more of the forehead, jaw, neck, chin, cheekbone and jaw of the face detected from the converted image.

The step of capturing an image can comprise a step of determining whether the eyes are open or closed by scanning the face and eyes on a real-time-basis and, if the eyes are judged to be open, activating the image capture mode.

The method of color correction for constructing a computer software program for color correction in accordance with an embodiment of the present invention can comprise the steps of: acquiring the image by capturing the image; detecting the face and eyes from the captured image; extracting the sclera and pupil of the detected eye(s); correcting the image by comparing the areas of the sclera and pupil extracted by separating the sclera and pupil with the reference values stored in a database; and extracting the skin color of the face from the corrected image.

The color correction system in accordance with an embodiment of the present invention can comprise: an acquisition unit for acquiring the image from a captured image; a detecting unit for detecting the face and eye(s) from the captured image; a separation unit for extracting the sclera and pupil of the detected eye(s); a correcting unit for correcting the image by comparing the areas of the sclera and pupil extracted by separating the sclera and pupil with the reference values stored in a database; and an extracting unit for extracting the skin color of the face from the corrected image.

The separation unit divides the sclera and pupil from the detected eye(s) using the Otsu algorithm and eye-shape mask and can extract the area of the sclera having a brightness higher than a preset value by dividing the sclera on the basis of a critical lighting value; and extract the area of the pupil having a brightness lower than a preset value by detecting the boundary between the pupil and sclera along on the circular contour of the pupil.

The correcting unit can convert the colors of the image on the basis of the reference values to which the area of the sclera extracted from the sclera having a brightness higher than a preset value and the area of the pupil extracted from the pupil having a brightness lower than a preset value are compared.

The extracting unit can extract the skin color by extracting a skin area with reference to the center of the face of the corrected image and comparing the extracted skin area to the measured values of stored skin color to detect the skin area of the face from the corrected image and to extract the skin color by filtering the skin area of the face on the basis of the measurement range of a L*a*b value.

The extracting unit can show the area of the facial skin extracted from the corrected image and the color of the facial skin extracted from the corrected image.

The color correction system can further comprise a storage unit for storing reference values in a database for extracting the color of the facial skin according to the difference lighting environments, wherein the storing unit can store the image correction measurement values of the sclera and pupil for image correction and the skin color measurement value measured with the face.

The storage unit can convert the images captured under different lighting environments with reference to the standard color tones including skin color.

The storage unit can store an average value of the measured values of the skin colors measured from at least one or more of the forehead, jaw, neck, chin, cheekbone and jaw of the face detected from the converted image.

The acquisition unit can determine whether the eyes are open or closed by scanning the face and eyes on a real-time-basis, and if the eyes are judged to be open, activate the image capture mode.

The color correction system in accordance with an embodiment of the present invention can extract correct skin colors from simple photographing process by utilizing the optical characteristics of a pupil and of the eye.

The color correction system in accordance with an embodiment of the present invention offers a practical method for extracting correct skin colors regardless of lighting environment without using any additional measuring instruments or devices by performing color correction utilizing the color tones of the sclera and pupil of the human eye on the basis of reference values.

The color correction system in accordance with an embodiment of the present invention can be applied to all individuals regardless of their race or region of origin because the system makes use of the sclera and pupil of the human eye, which are common to all humans.

In addition, the color correction system in accordance with an embodiment of the present invention is expected to become a core technology for various application software programs in accordance with the development of communication technology and mobile devices, since the system is easily scalable by offering user convenience and multi-racial applicability.

DETAILED DESCRIPTION

Figure 1:
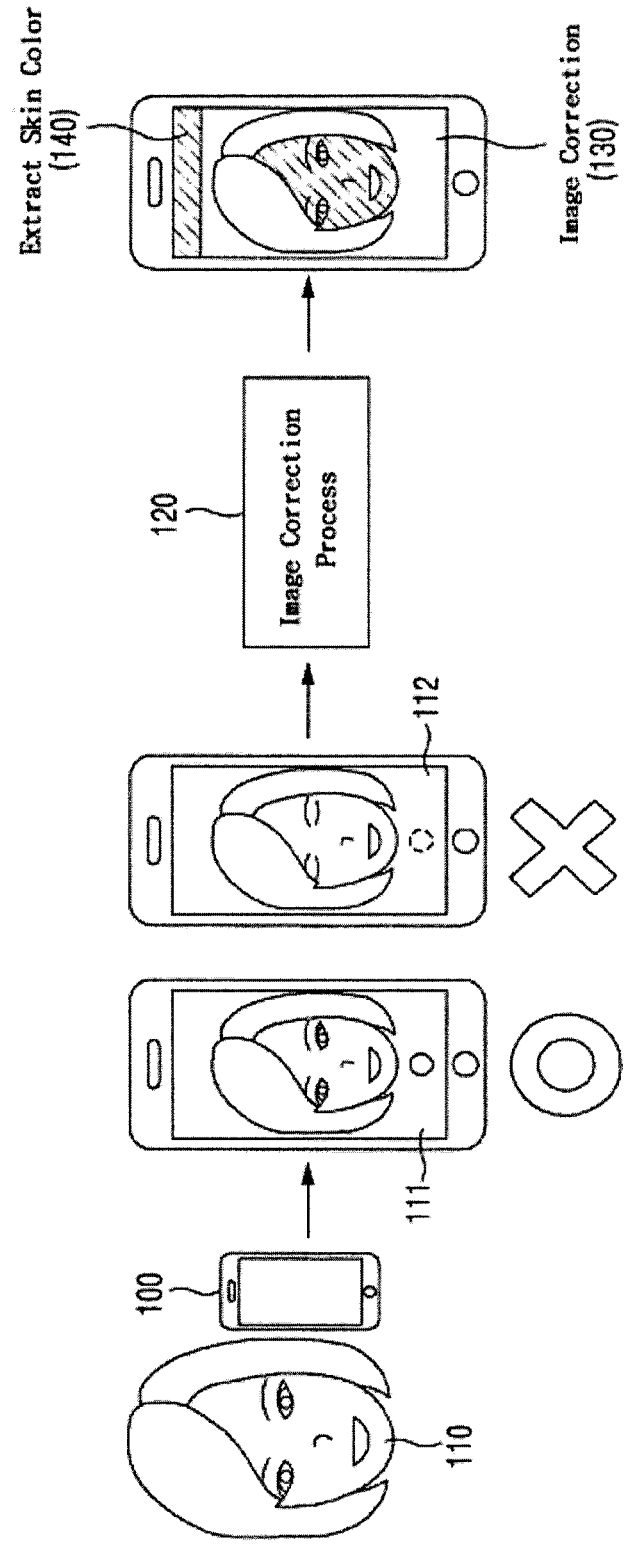
FIG. 1 is a schematic flow chart of the operation of a color correction system in accordance with an embodiment of the present invention.

An exemplary embodiment of the present invention is described in detail referring to accompanying drawings FIG. 1 is a schematic flow chart of the operation of a color correction system in accordance with an embodiment of the present invention, The color correction system 100 can run on a PC (personal computer), a notebook computer, a laptop computer, a smart phone, a tablet, a wearable computer, or a TV in the form of application software. The description below is based on the assumption that the color correction system 100 is running in FIG. 1.

A terminal can be provided with a function for capturing an image of a subject (110), for example, a user. The terminal can take a picture of the user. The terminal can determine whether the eyes of the user are open or closed by scanning the face and eyes of the user. If it is determined that the eyes are open, the terminal can activate image capture mode (111). On the other hand, if it is judged that the eyes are closed, the terminal can deactivate image capture mode (112).

The terminal can acquire a captured image to conduct the image correction process (120) for extracting the color of the facial skin in the image. The terminal can separate the sclera and pupil of an eye by detecting the eye, and after separating the sclera and pupil, it can correct the color of the image by comparing the extracted areas of the sclera and pupil with preset, stored reference values. The process of image correction is described in detail below referring to preferred embodiments.

The terminal can extract and show the area of the facial skin extracted from the corrected image (130) and the color of the facial skin (140) extracted from the corrected image.

Figure 2:
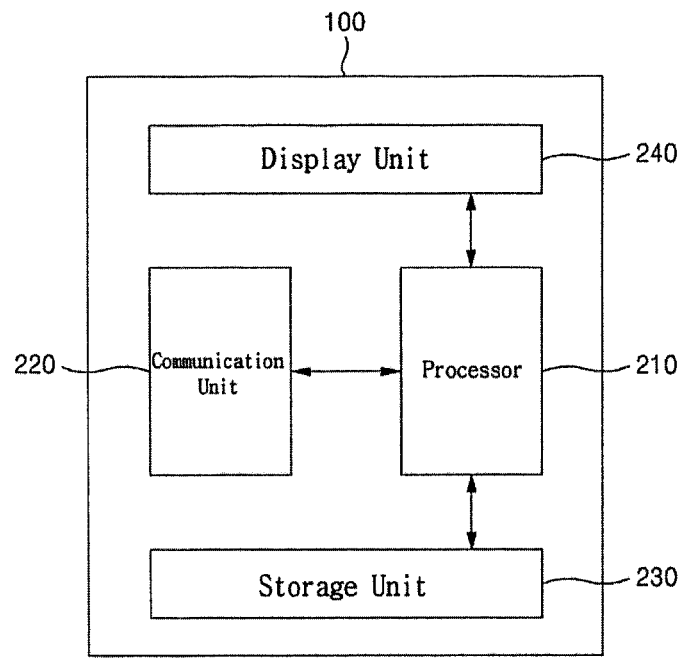
FIG. 2 is a block diagram depicting a configuration of a color correction system in accordance with an embodiment of the present invention.

FIG. 2 is a block diagram depicting a configuration of a color correction system in accordance with an embodiment of the present invention.

The color correction system (100) can comprise a processor (210), a communication unit (220) and a display unit (230). In addition, the color correction system (100) can further comprise a storage unit (230) for storing the data used for extracting the color of the facial skin under different lighting environments.

The processor (210) can control the elements of the color correction system (100) and can run the software program or application used by the color correction system (100). In addition, the processor (210) can process the operation required for the execution of the software program or application and data processing.

The communication unit (220) can be a hardware module, e.g., a network interface card of a player, a network chip or a networking interface port, a network device driver, or a software module such as a networking program, that transmits and receives data and/or information to and from an independent server of other terminals.

The storage unit (230) for storing the data of information of the color correction system (100) can be a memory or other type of storage device. The storage unit (230) can store the software or application run by the processor (210) and related information.

The display unit (240) can display captured images and can show the area of the facial skin extracted from the corrected image and the color of the facial skin extracted from the corrected image.

Figure 3:
FIG. 3 is a block diagram showing the structural elements that can be included in the processor of a color correction system in accordance with an embodiment of the present invention.

FIG. 3 is a block diagram showing the structural elements that can be included in a processor of a color correction system in accordance with an embodiment of the present invention.

The processor (210) included in the color correction system can comprise an acquisition unit (310), a detection unit (320), a separation unit (330), a correction unit (340) and an extraction unit (350). The processor (210) and the elements of the processor (210) can be configured to execute an instruction given by the code of an operating system and the code of at least one software program in a memory device. Here, the elements of the processor (210) can be the expressions of different functions executed by the processor (210) in compliance with the control instructions provided by the software code stored in the color correction system.

The acquisition unit (310) can acquired an image when the image is captured. The acquisition unit (310) can determine whether the eyes are open or closed by scanning the face and eyes on a real-time-basis, and if the eyes are determined to be open, activate the image capture mode.

The detection unit (320) can detect the face and eyes from a captured image.

The separation unit (330) can separate the sclera and pupil from the detected eye. The separation unit (330) divides the sclera and pupil from the detected eye(s) using the Otsu algorithm and eye-shape mask and can extract the area of the sclera having a brightness higher than a preset value by dividing the sclera on the basis of a critical lighting value and extract the area of the pupil having a brightness lower than a preset value by detecting the boundary between the pupil and sclera along the circular contour of the pupil.

The correction unit (340) can correct an image by comparing the areas of the sclera and pupil extracted by separating the sclera and pupil with the reference values stored in a database. The correction unit (340) can convert the colors of the image on the basis of the reference values to which the area of the sclera extracted from the sclera having a brightness higher than a preset value and the area of the pupil extracted from the pupil having a brightness lower than a preset value are compared.

The extraction unit (350) can extract the color of facial skin from a corrected image. The extracting unit (350) can extract the skin color by extracting a skin area with reference to the center of the face of the corrected image and comparing the extracted skin area to the measured values of stored skin color to detect the skin area of the face from the corrected image and to extract the skin color by filtering the skin area of the face on the basis of the measurement range of a $L^*a^*b$ value. The extraction unit (350) can show the area of the facial skin extracted from the corrected image and the color of the facial skin extracted from the corrected image.

Figure 4:
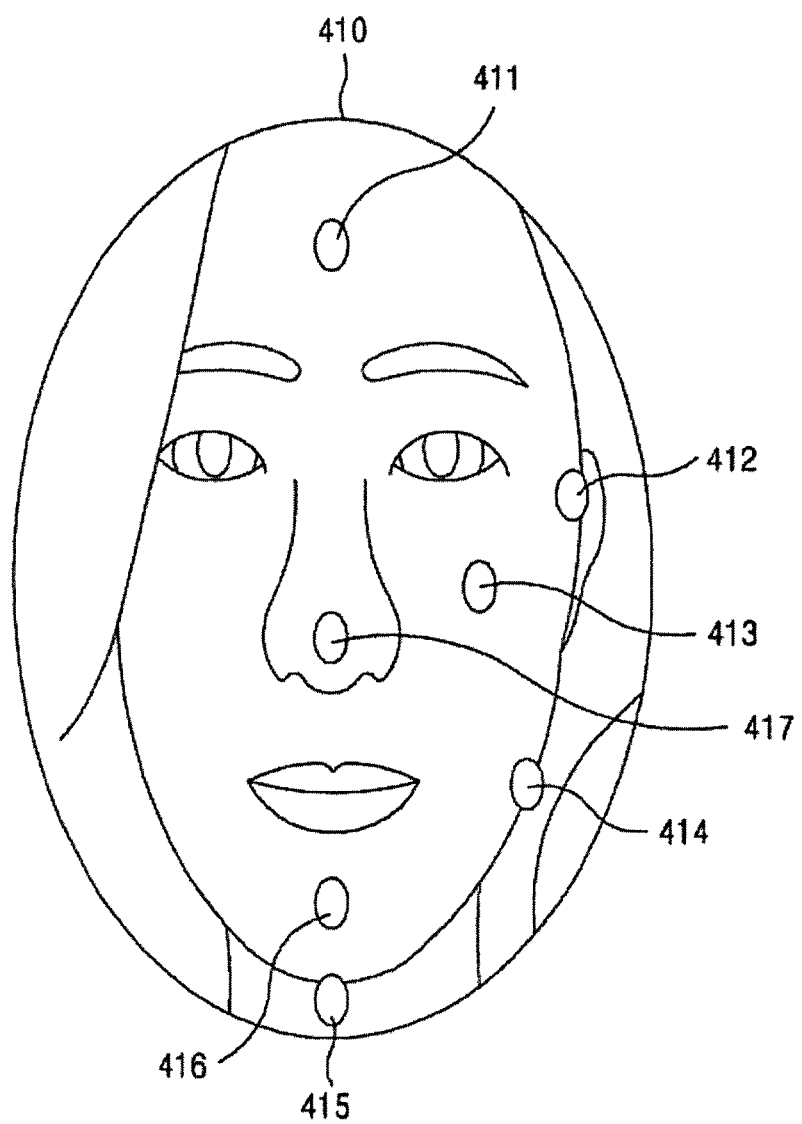
FIG. 4 is an image exemplifying data acquisition of a color correction system in accordance with an embodiment of the present invention.

FIG. 4 is an image exemplifying data acquisition of a color correction system in accordance with an embodiment of the present invention.

The color correction system can store data for extracting facial skin colors under different lighting environments in a database. More particularly, the color correction system can take pictures of a plurality of faces of different users under diversified lighting environments. At this time, the images can be captured with diversified color tones, intensity of illuminations, color temperatures, etc. by the devices capturing the images, and diversified lighting environments can be produced according to the environment of image capturing. For example, data for extracting skin colors can be acquired by taking the pictures of the users of a number more than a predetermined number (e.g., 300 persons) and of a predetermined range of age (e.g., between from 17 to 56).

The color correction system can convert the images captured under different environments with reference to the standard color tones including skin color. For example, the color correction system can convert the images captured with a standard color table under different lighting environments with reference to the standard color table.

The color correction system can detect the face and eye areas from an image using computer graphic technique or face detector (e.g., Viola-Jones Face Detector). For example, the color correction system can separate the sclera and pupil from the eye area using the Otsu algorithm and an eye-shaped mask. The sclera which reflects light is captured in a color tone reflecting the characteristics of the lighting environment, and the pupil, which absorbs light, is black but affected by the correction process of the image capturing device. Accordingly, the color correction system can separate the sclera and pupil of the eye from an image. The technique for separating the sclera and pupil is not limited to the above algorithm as various other techniques that can separate the pupil and sclera of an eye are also available.

The color correction system can extract the area of the sclera by dividing the sclera into a brighter area and a darker area with reference to the critical value of illumination. The color correction system can extract the area of the sclera where the brightness is higher than a preset level for color correction. The color correction system takes the area of the extracted sclera brighter than a preset level as a white area without being affected by blood vessels, specks, etc.

In addition, the color correction system can detect the interference between the pupil and sclera along the circular contour of the pupil using the Hough transformation. The color correction system can extract the area of pupil where the brightness is lower than a preset level from an extracted pupil by detecting the interference between the pupil and sclera.

As described above, the color correction system of the present invention can save the area of sclera where the brightness is higher than a preset level and the area of pupil where the brightness is lower than a preset level extracted above in a database. For example, the color correction system of the present invention can save the image-corrected measured value of the area of sclera where the brightness is higher than a preset level and the area of pupil where the brightness is lower than a preset level in a database. At this time, the measured image-corrected measurement values can be updated at each addition or deletion of an image sample.

The color correction system can save information of the skin color of a specific area of a face included in an image converted with reference to the standard color table. The color correction system can measure the skin color of at least one or more of the forehead, nose tip, chin, neck, cheek cheekbones and jaw (411~417) of the face detected from the image (410). Here, the color correction system can derive the final range of skin colors with reference to the measured skin color information on the basis of a L*a*b value.

The color correction system can calculate an average value of at least one or more of the skin colors of the measured areas. The color correction system can save the average value obtained by averaging the measured values of the skin colors in a database. Similarly, the measured value of the skin color can be updated at each addition or deletion of an image sample.

The color correction system can save in the database the image correction measured values of the sclera and pupil for image correction and the values of skin colors measured with the face. With the data, the color correction system can derive reference values for the sclera and pupil and reference values for extracting facial skin color for image correction.

The color correction system in accordance with an embodiment of the present invention can be applied to all individuals regardless of their race or region of origin because the system makes use of the sclera and pupil of the human eye, which is common to all humans.

The color correction system in accordance with an embodiment of the present invention can standardize data by constructing a database, measure the skin color of a region on the basis of the standardized data to derive a target value and actual skin range, and extract skin color accordingly.

Figure 5:
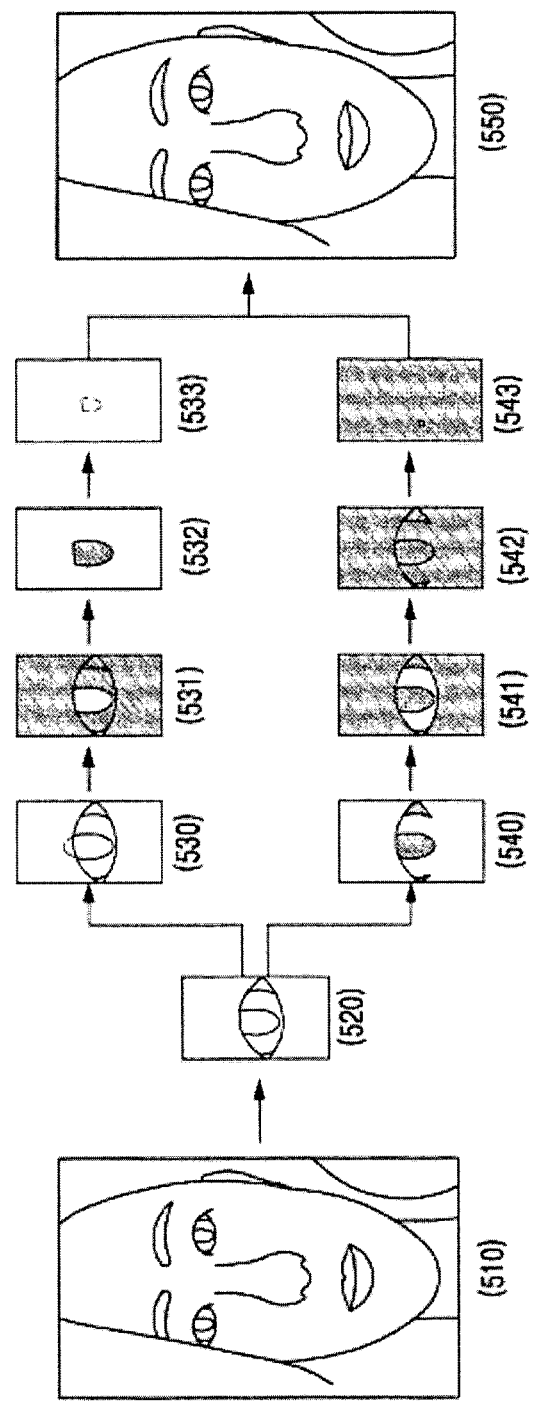
FIG. 5 is a flow chart illustrating a method for correcting an image utilizing the sclera and pupil of an eye of a color correction system in accordance with an embodiment of the present invention.

FIG. 5 is a flow chart illustrating a method of correcting an image utilizing the sclera and pupil of an eye of a color correction system in accordance with an embodiment of the present invention.

The color correction system can acquire images (510). The color correction system can scan the face and eyes and detect the eyes from an acquired image (520). The color correction system can separate the sclera and pupil of an eye by detecting the eye from an image (530, 540). For example, the color correction system can separate the sclera and pupil from the eye area using the Otsu algorithm and an eye-shaped mask.

Steps (530~533), the color correction system, for example, can classify the pixels by brighter group and darker group by determining a critical value for illumination for dividing the sclera from skin pixels on the basis of the Otsu algorithm. After dividing the sclera, the area of the sclera with a brightness higher than a predetermined level can be extracted for color correction in order to eliminate the effects of the shade cast by the eyelid and the dark blood vessels in the sclera. For example, the color correction system can extract 10% of highest brightness from the sclera. A value corresponding with the 10% of the brightest area extracted from the sclera can be derived.

In addition, the color correction system can detect a pupil by using, for example, the Hough transformation in Steps (540~534). The Hough transformation can identify the interface between the pupil and the sclera along a circular contour. The color correction system can extract an area of pupil where the brightness is lower than a preset level from an extracted pupil. At this time, an area of the pupil where the brightness is lower than a preset level can be extracted in order to remove the effect of the light reflection due to the transparent cornea. For example, the color correction system can extract 10% of darkest area from a pupil. A value corresponding with the 10% of the darkest area extracted from the pupil can be derived.

The color correction system can convert the colors of the image on the basis of the reference values to which the area of the sclera extracted from the sclera having a brightness higher than a preset value and the area of the pupil extracted from the pupil having a brightness lower than a preset value (550).

Figure 6:
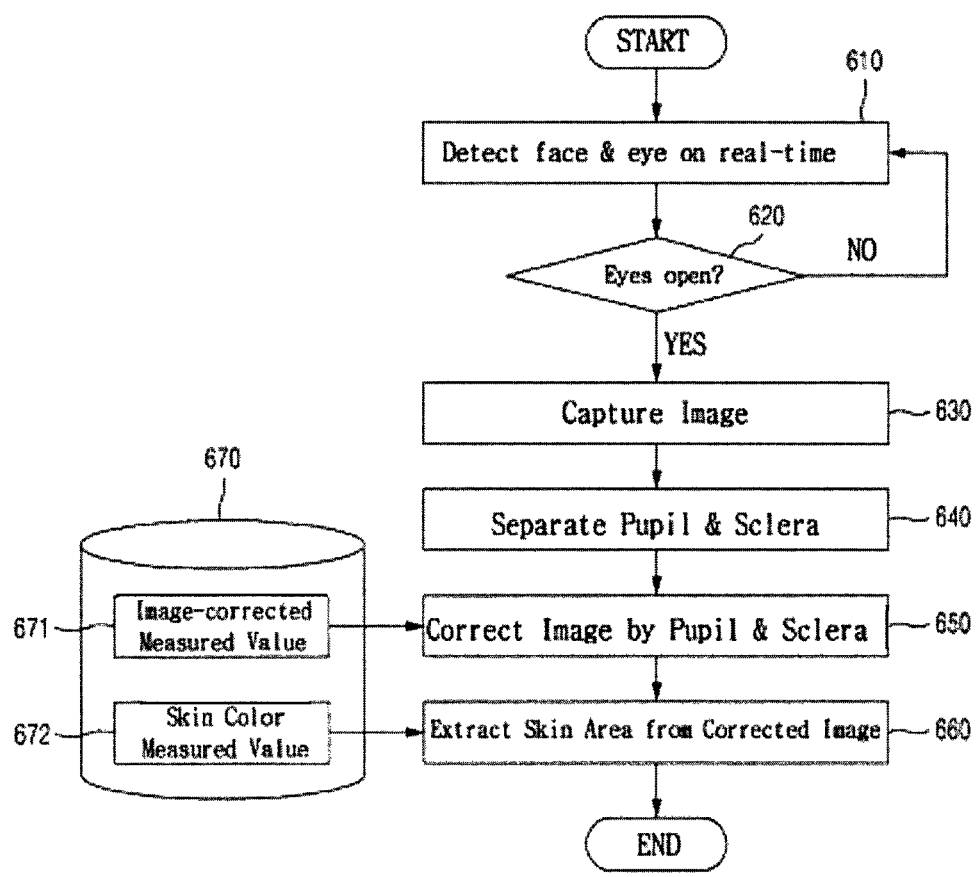
FIG. 6 and FIG. 7 are flow charts describing the method for color correction of a color correction system in accordance with an embodiment of the present invention.
Figure 7:
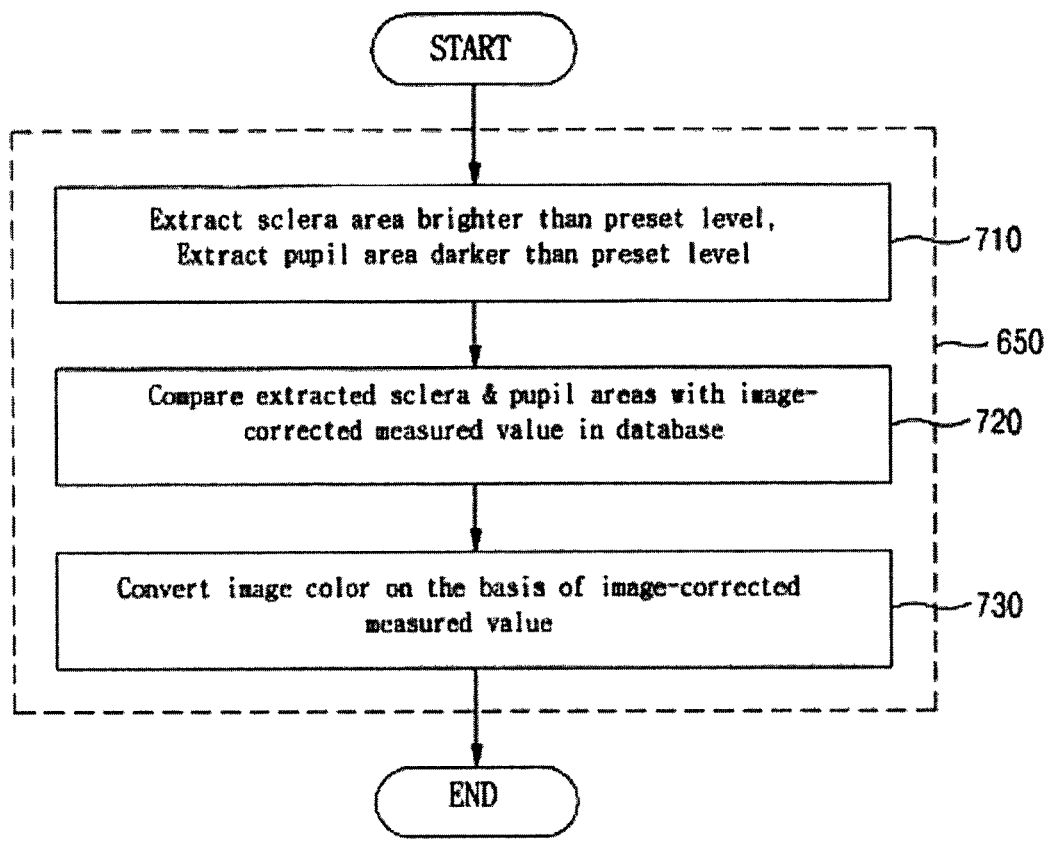

FIG. 6 and FIG. 7 are flow charts describing the method of color correction of a color correction system in accordance with an embodiment of the present invention.

In Step (610), the color correction system can detect the user's face and eyes on a real-time-basis. For example, the color correction system can detect the user's face and eyes through a camera.

In Step (620), the color correction system can determine whether or not the eyes of the user are open. For example, the color correction system can determine that the eye is open if the eye area comes under a preset size range. At this time, if it is determined that the user's eyes are closed, the system can detect the face and eyes again.

In Step (630), the color correction system can capture an image if the user's eyes are open. The color correction system can capture an image of the user while the eyes of the user are open when capturing an image with a camera.

In Step (640), the color correction system can separate the pupil and sclera from an eye included in the image.

In Step (650), the color correction system can correct the image on the basis of the pupil and sclera. The color correction system can correct the image by comparing the areas of the sclera and pupil extracted by separating the sclera and pupil with the reference values stored in a database. Here, the database (670) can store reference values for extracting facial skin colors under different lighting environments in a database. For example, the database can store image-corrected measured values (671) of the sclera and pupil and the measured skin color values (672) of the face for image correction. A detailed description of the database (670) is provided below referring to FIG. 4.

With regard to FIG. 7, the color correction system can extract an area of the sclera where the brightness is higher than a predetermined value and extract an area of the pupil where the brightness is lower than a predetermined value in Step (710). In Step (720), the color correction system can compare the measured values of the extracted areas of the sclera and pupil with the measured image-corrected values stored in the database. In Step (730), the color correction system can convert the color of the image on the basis of the measured image-corrected value.

In Step (660), the color correction system can extract the skin area from the corrected image. In particular, the color correction system can extract the skin color by extracting the skin area with reference to the center of the face of the corrected image and comparing the extracted skin area to the measured values of the skin color stored in the database to detect the skin area of the face from the corrected image and to extract the skin color by filtering the skin area of the face on the basis of the measurement range of a L*a*b value. The color correction system can provide the skin area and skin color extracted from the corrected image.

The color correction system in accordance with an embodiment of the present invention can improve the accuracy of skin color estimation.

The apparatus described above can be implemented by hardware elements or software elements, and/or combinations of hardware elements and software elements. For example, the apparatuses described in the embodiments and elements thereof can be implemented with one or more general purpose computers or special purpose computers, such as a process, a controller, an arithmetic logic unit (ALU), a digital signal processor, a microcomputer, a field programmable gate array (FPGA), a programmable logic unit (PLU), a microprocessor, or any other device that can execute and respond to an instruction. The processing unit can run an operating system (OS) and one or more software applications run on said operating system. In addition, the processing unit can access, store, operate, process and generate data in response to execution of software. For the convenience of readers' understanding, the above description may include a single processing unit; however, it would be obvious for those skilled in the art that the processing unit can comprise a plurality of processing elements and/or a plural type of processing elements. For example, the processing unit can comprise a plurality of processors or one processor and one controller. In addition, different processing configurations such as parallel processors may also do.

The software can comprise a computer program, codes, instructions, or one or more combinations thereof, and the processing unit can be configured to be able to operate as instructed, or can be instructed independently or collectively. The software and/or data can be embodied permanently or temporarily in a certain type of machine, a component, a physical device, virtual equipment, a computer storage medium or device to be able to be interpreted by a processing unit or to provide instructions or data to a processing unit. The software can be stored or run in a distributed way by being installed on a distributed computer systems connected by a network. The software and data can be stored in one or more recording media device readable with a computer system.

The method in accordance with an embodiment of the present invention can be implemented in a form of a program that can be executed by various computer-means and recorded in a computer-readable medium. The computer-readable medium can comprise program instructions, data file, and/or data structure independently or by combinations thereof. The program instructions recorded in the medium can be specially designed and fabricated for the present invention or generic software available for any person skilled in computer software. The examples of computer-readable recording media includes magnetic media such as hard discs and magnetic tape, optical media such as CD-ROMs and DVDs, magneto-optical media such as floptical discs, and hardware devices specially configured to store and execute program instructions, such as ROM, RAM and flash memory devices. Examples of software instruction include machine codes generated by a compiler and high level language codes that can be executed by a computer system using an interpreter.

From the foregoing it is believed that those skilled in the pertinent art will recognize the meritorious advancement of this invention and will readily understand that while the present invention has been described in association with a preferred embodiment thereof, and in the accompanying drawings, numerous changes and modifications may be made therein by those skilled in the art without departing from the spirit and scope of this invention. For example, the technologies disclosed herein may be executed in an order different from the description, and/or the described system, structure, device, circuits, or other elements may be combined in difference configurations, or substituted or replaced by other elements or equivalents, achieving appropriate results.

Accordingly, other implements, embodiments and equivalents to the claims shall be included in the claims provided herein below.

What is claimed is:

1. A method of correcting colors, comprising the steps of:
acquiring an image by capturing an image;
detecting a face and the eyes from the captured image;
extracting a sclera and a pupil of the detected eyes;
correcting the image by comparing the areas of the sclera and pupil extracted by separating the sclera and pupil with the reference values stored in a database; and
extracting a skin color of the face from the corrected image.

2. The method of correcting colors of claim 1, wherein the step of separating the sclera and pupil of the detected eye comprises the steps of:
dividing the sclera and pupil from the detected eye using the Otsu algorithm and eye-shape mask, extracting the area of the sclera having a brightness higher than a preset value by dividing the sclera on the basis of a critical lighting value; and
extracting the area of the pupil having a brightness lower than a preset value by detecting the boundary between the pupil and sclera along the circular contour of the pupil.

3. The method of correcting colors of claim 1, wherein the step of correcting the image comprises a step of converting the colors of the image on the basis of the reference values to which the area of the sclera extracted from the sclera having a brightness higher than a preset value and the area of the pupil extracted from the pupil having a brightness lower than a preset value are compared.

4. The method of correcting colors of claim 1, wherein the step of extracting the skin color of the face from the corrected image comprises a step of extracting the skin color by extracting a skin area with reference to the center of the face of the corrected image and comparing the extracted skin area to the measured values of stored skin color to detect the skin area of the face from the corrected image and to extract the skin color by filtering the skin area of the face on the basis of the measurement range of a L*a*b value.

5. The method of correcting colors in claim 4, wherein the step of extracting the skin color of the face from the corrected image comprises a step of displaying the area of the facial skin extracted from the corrected image and the color of the facial skin extracted from the corrected image.

6. The method of correcting colors of claim 1, further comprising a step of storing reference values for extracting the skin colors of the face under different lighting environments in a database, wherein storing the reference values for extracting the skin colors of the face under different lighting environments in a database comprises storing in the database the image correction measured values of the sclera and pupil for image correction and the values of skin colors measured with the face.

7. The method of correcting colors of claim 6, wherein the step of storing the reference values for extracting the skin colors of the face under different lighting environments in a database further comprises a step of converting the images captured under different lighting environments with reference to the standard color tones including the skin color.

8. The method of correcting colors of claim 7, wherein the step of storing the reference values for extracting the skin colors of the face under different lighting environments in a database further comprises a step of storing an average value derived from the measured values of the skin colors measured from at least one or more of a forehead, a nose tip, a chin, a neck, a cheek, a cheekbone and a jaw of the face detected from the converted image.

9. The method of correcting colors of claim 1, wherein the step of acquiring an image by capturing an image further comprises a step of determining whether the eyes are open or closed by scanning the face and eyes on a real-time-basis, and if the eyes are determined to be open, activating the image capture mode.

10. A system for correcting colors, comprising:
- an acquisition unit for acquiring an image by capturing an image;
- a detecting unit for detecting a face and eyes from the captured image;
- a separating unit for separating a sclera and a pupil of the detected eye(s);
- a correcting unit for correcting the image by comparing the areas of the sclera and pupil extracted by separating the sclera and pupil with reference values stored in a database; and
- an extraction unit for extracting a skin color of the face from the corrected image.

11. The system for correcting colors of claim 10, wherein the separating unit is characterized by:
- dividing the sclera and pupil from the detected eye using the Otsu algorithm and eye-shape mask, extracting the area of the sclera having a brightness higher than a preset value by dividing the sclera on the basis of a critical lighting value; and
- extracting the area of the pupil having a brightness lower than a preset value by detecting the boundary between the pupil and sclera along the circular contour of the pupil.

12. The system for correcting colors of claim 10, wherein the correction unit is characterized by converting the colors of the image on the basis of the reference values to which the area of the sclera extracted from the sclera having a brightness higher than a preset value and the area of the pupil extracted from the pupil having a brightness lower than a preset value are compared.

13. The system for correcting colors of claim 10, wherein the extraction unit is characterized by extracting the skin color by extracting a skin area with reference to the center of the face of the corrected image and comparing the extracted skin area to the measured values of stored skin color to detect the skin area of the face from the corrected image and to extract the skin color by filtering the skin area of the face on the basis of the measurement range of a L*a*b value.

14. The system for correcting colors of claim 13, wherein the extraction unit is characterized by,
- displaying the area of the facial skin extracted from the corrected image and the color of the facial skin extracted from the corrected image.

15. The system for correcting colors of claim 10, further comprising a storage unit for storing reference values for extracting the skin colors of the face under different lighting environments in a database, and storing the image correction measured values of the sclera and pupil for image correction and the values of skin colors measured with the face.

16. The system for correcting colors of claim 15, wherein the storage unit is characterized by converting the images captured under different lighting environments with reference to the standard color tones including skin color.

17. The system for correcting colors of claim 16, wherein the storage unit is characterized by storing an average value derived from the measured values of the skin colors measured from at least one or more of a forehead, a nose tip, a chin, a neck, a cheek, a cheekbone and a jaw of the face detected from the converted image.

18. The system for correcting colors of claim 10, wherein the acquisition unit is characterized by
- determining whether the eyes are open or closed by scanning the face and eyes on a real-time-basis, and if the eyes are determined to be open, activating the image capture mode.

* * * * *